April 5, 1966  F. W. GUTZWILLER  3,244,965
PHASE CONTROLLED ALTERNATING CURRENT CIRCUITS
Filed April 9, 1962  2 Sheets-Sheet 1

Inventor:
Frank W. Gutzwiller,
by Joseph V. Claeys
His Attorney.

United States Patent Office 3,244,965
Patented Apr. 5, 1966

3,244,965
PHASE CONTROLLED ALTERNATING
CURRENT CIRCUITS
Frank W. Gutzwiller, Auburn, N.Y., assignor to General
Electric Company, a corporation of New York
Filed Apr. 9, 1962, Ser. No. 186,602
13 Claims. (Cl. 323—22)

This invention relates to phase controlled alternating current circuits for controlling the voltage and current applied to a load supplied from an alternating current source and in particular to such circuits utilizing semiconductor devices. This application is a continuation-in-part of my copending application Serial No. 46,189, filed July 29, 1960 for Phase Controlled Alternating Current Circuist, now abandoned.

Some of the most widely used means previously employed for controlling the voltage and current applied to a load supplied from an alternating current source have been variable autotransformers, saturable reactors and phase controlled alternating current circuits utilizing thyratron tubes or magnetic amplifiers. All such prior means are large and heavy and in addition previous phase controlled alternating current circuits have required expensive components and complex circuitry.

With the advent of the semiconductor controlled rectifier there has been provided a new solid state device capable of controlling large currents at several hundred volts. This new device, in common with all semiconductor devices possesses inherent reliability, small size and high efficiency. This invention deals with a new and improved phase controlled alternating current circuit which provides another advance in circuit simplicity, saving in circuit components and allows for a higher degree of miniaturization than any prior art circuit of this type.

Phase controlled alternating current circuits are also known which utilize a plurality of semiconductor controlled rectifiers and one or more trigger circuits for firing the controlled rectifiers. For example, one type of phase controlled alternating current circuit which has previously been used for such purposes as lamp dimming, temperature control and voltage and current regulation utilizes two controlled rectifiers connected back-to-back across an alternating current source, a rectifying circuit and a firing circuit connected thereto for delaying the point in the alternating current cycle at which alternate controlled rectifiers become conducting thereby achieving fullwave phase controlled alternating current across the load.

An object of this invention is to provide an improved phase controlled alternating current circuit which provides one or more advantages over the prior-art arrangements for many applications.

Another object of this invention is to provide an improved and simplified phase controlled alternating current circuit for achieving fullwave alternating current across a load supplied from an alternating current source.

It is another object of this invention to provide an improved and simplified phase controlled alternating current circuit utilizing a single semiconductor controlled rectifier.

Still another object of this invention is to provide a phase controlled alternating current circuit which offers small size, reliability, circuit simplicity and savings in components as compared to prior art circuits.

Controlled rectifiers are semiconductor devices now well-known to the art. Such devices comprise a semiconductive body having four zones, contiguous zones being of opposite conductivity type, and defining at least three P-N junctions. Electrodes are provided to the two end zones and one of the intermediate zones. The electrode connected to the intermediate zone is called the "gate electrode."

Controlled rectifiers are much like an ordinary rectifier which has been modified to block in the forward direction until a small signal is applied to the gate electrode. After the signal is applied to the gate electrode, the controlled rectifier conducts in the forward direction with a forward characteristic very similar to that of a conventional rectifier and continues to conduct even after the gate signal is removed. Conduction continues as long as the current through the device remains greater than a minimum value called the "holding current." As soon as the current through the device drops below this holding current, the controlled rectifier reverts back to its forward blocking condition. As used hereinafter in the description and claims, the two operating conditions of the controlled rectifier are referred to as the "blocking state" and the "conducting state."

Briefly stated, in accordance with one aspect of this invention, a phase controlled alternating current circuit comprises a fullwave rectifier circuit adapted for connection to a source of alternating current. A controlled rectifier, capable of operation in a blocking and a conducting state is connected to the rectifier circuit such that forward bias is applied to the controlled recifier at each half cycle of the alternating current source. Means synchronized with the alternating current source are connected to the controlled rectifier to provide for controlling the point in the alternating current cycle at which the controlled rectifier switches from its blocking to its conducting state.

The novel features which I believe to be characteristic of my invention are set forth with particularity in the appended claims. My invention itself, however, together with further objects and advantages thereof will best be understood by reference to the following description taken in conjunction with the accompanying drawing in which:

Figure 1:
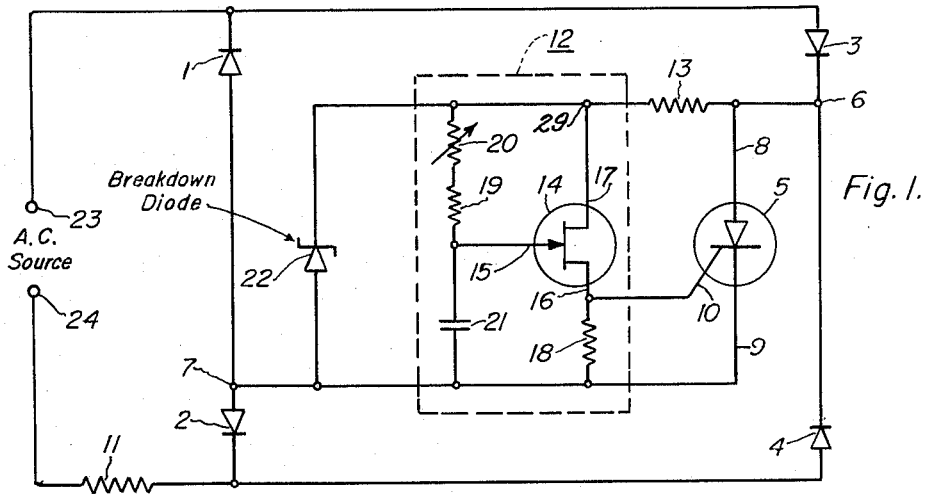
FIGURE 1 is a schematic diagram of one embodiment of the present invention.

In FIGURE 1 there is shown a conventional single phase bridge type rectifier adapted for connection to a source of alternating current and providing fullwave rectification therefor. The rectifier bridge includes four rectifier units, such as for example, diodes 1, 2, 3 and 4, respectively. Diodes 1 and 2 are connected in series poled for opposite current flow and form one branch of the rectifier bridge, while diodes 3 and 4 are similarly connected and form the other branch thereof. Controlled rectifier 5 is connected inside the bridge between the points 6 and 7. Controlled rectifier 5 has an anode electrode 8, a cathode electrode 9 and a gate electrode 10. Points 6 and 7 are the junctions between diodes 1 and 2 of one branch of the rectifier bridge and diodes 3 and 4 of the other branch thereof. By this configuration of bridge type rectifier circuit and semiconductor controlled rectifier, a forward bias is applied to controlled rectifier 5 each half cycle of the alternating current source. A load, shown schematically as resistance 11, is connected in series with the alternating current line. Thus, load current must always flow through the controlled rectifier 5. The voltage and current applied to the load 11 are controlled by delaying the point in the alternating current cycle at which the controlled rectifier switches from its blocking to its conducting state. In the circuit illustrated in FIGURE 1, this is provided by a trigger or "firing" circuit generally designated at 12.

Trigger circuit 12 is basically a relaxation oscillator circuit connected through resistance 13 between the points 6 and 7 of the bridge type rectifier circuit. Since the point 6 is always positive with respect to the point 7, this connection provides a convenient voltage source for the trigger circuit thereby eliminating the need for either a separate rectifier circuit or synchronizing means. For example, both controlled rectifier 5 and relaxation oscillator trigger circuit 12 are connected to the same source of fullwave rectified voltage and are synchronized at all times.

Trigger circuit 12 includes a switching device and associated circuitry to vary the time at which the switching device becomes conducting. Examples of switching devices which may be utilized in trigger circuit 12 are transistors, glow tubes, multilayer diodes and double-base diodes. For positive firing of all presently commercially available controlled rectifiers, a minimum gate voltage of approximately three volts is required. For this and other reasons such as stability of the firing voltage, low firing current and operation over a wide temperature range, it is desirable for many applications to utilize a double-base diode. In addition, it is more economical when the trigger circuit utilizes all solid state devices rather than, for example, employing a saturable core.

Double-base diodes have been described by Lesk, U.S. Patent No. 2,769,926 and Engel, U.S. Patent No. 2,907,934, both of which are assigned to the assignee of the present invention.

The double-base diode is a three-terminal device having a stable N-type negative resistance characteristic over a wide temperature range. Double-base diodes are also referred to in the art as "unijunction transistors." The device comprises a semiconductor body mounted between two ohmic base contacts with a P-type emitter near "base two." The device operates by conductivity modulation of the semiconductive material between the emitter and "base one" when the emitter is forward biased. In the nonconducting condition, the emitter and interbase power supplies establish potentials between the base contacts and at the emitter such that the emitter is back biased. Between "base one" and "base two" electrodes the device exhibits characteristics of an ordinary resistance. As long as the emitter voltage is less than the "emitter peak point voltage," the emitter is reversely biased and substantially no current flows. When the emitter voltage exceeds this value and the emitter current is greater than the current corresponding to the emitter peak point voltage, the device becomes conducting.

The peak point voltage varies in proportion to the interbase voltage so that the double-base diode may be rendered conducting by reducing either the interbase voltage or the supply voltage. The double-based diode relaxation oscillator trigger circuit may be made to produce an output at a particular point during the alternating current cycle by applying a synchronizing pulse to the base-two electrode. As illustrated in the circuit in FIGURE 1, however, the main supply voltage is used to synchronize the trigger circuit. For example, the fullwave rectified signal obtained from the rectifier bridge supplies both power and synchronizing signal to the trigger circuit.

Trigger circuit 12 includes double-base diode 14, having emitter electrode 15, "base-one" electrode 16 and "base-two" electrode 17. "Base-two" electrode 17 is connected to one end of resistance 13, the other end of which is connected to the rectifier bridge at point 6. Resistance 18 is connected from "base-one" electrode 16 to the other side of the voltage source at point 7. Gate electrode 10 of controlled rectifier 5 is connected to the output of trigger circuit 12 at the junction between resistance 18 and "base-one" electrode 16. A series combination of resistance 19, variable resistance 20 and capacitance 21 is connected across double-base diode 14. Emitter electrode 15 is connected to the junction of resistance 19 and capacitance 21. A breakdown or zener-type diode 22 is connected across double-base diode 14 and serves to clip and regulate the peaks of the fullwave alternating current supplied to the trigger circuit 12. Resistance 13 is a current limiting resistance for breakdown diode 22.

While the circuit configuration of FIGURE 1 has been described in detail for a fullwave bridge type rectifier circuit, it will be understood by those skilled in the art that other fullwave rectifier circuits may be utilized. For example, a conventional fullwave rectifier circuit may be employed utilizing two rectifier units and a center-tapped transformer. The controlled rectifier 5, however, must be connected to the rectifier circuit so that forward bias is applied to the controlled rectifier each half cycle of the alternating current source.

In operation, controlled rectifier 5 is subjected to a single phase fullwave rectified sine wave by the action of the diodes 1 to 4 in the bridge type rectifier. Thus, a forward bias is applied to the controlled rectifier each half cycle. This may be illustrated most effectively by following the instantaneous polarities of the alternating current source. When terminal 23 is positive the path of current is through diode 3, controlled rectifier 5, diode 2 and load 11 to the other side of the line. When terminal 24 is positive, the path of current is through the load 11, diode 4, controlled rectifier 5 and diode 1 to the other side of the line. It is apparent, therefore, that the load current always flows through the controlled rectifier 5 and that forward bias is applied thereto at each half of the alternating current cycle.

The current and voltage applied to the load are controlled by delaying the point in the alternating current cycle at which controlled rectifier 5 switches from its blocking to its conducting state. This is accomplished in the circuit of FIGURE 1 by operation of the trigger circuit 12.

In trigger circuit 12 capacitor 21 is charged through resistance 19–20 until the emitter voltage of the double-base diode 14 reaches a value in excess of the emitter peak point voltage thereof. When this occurs, double-base diode 14 is rendered conducting causing capacitor 21 to discharge through resistance 18. The discharge of capacitance 21 lowers the emitter voltage until at a value of approximately two volts double-base diode 14 ceases to conduct. Double-base diode 14 is then in condition to repeat the cycle. Since at the end of each half cycle the voltage at the "base-two" electrode 17 of double-base diode 14 drops to or is already at zero, capacitance 21 is discharged at the beginning of each half cycle and the trigger circuit is thus synchronized with the line.

The discharge current from capacitance 21 produces a positive pulse across resistance 18 which is applied to gate electrode 10 of controlled rectifier 5. The positive pulse on gate electrode 10 causes controlled rectifier 5 to switch from its blocking to its conducting state allowing current from the alternating current source to flow through the load 11.

The period of the relaxation oscillator trigger circuit 12 and hence the firing angle of controlled rectifier 5 is controlled by variable resistance 20. Minimum output occurs when resistance 20 is a maximum since at this setting the voltage across capacitance 21 cannot reach the emitter peak point voltage of the double-base diode 14 before there is a reversal in the line voltage. The amplitude of the positive pulse across resistance 18 is determined by the characteristics of double-base diode 14 and by the value of capacitance 21, resistance 18, the late characteristics of controlled rectifier 5 and the voltage between the points 29 and 7.

Figure 2:
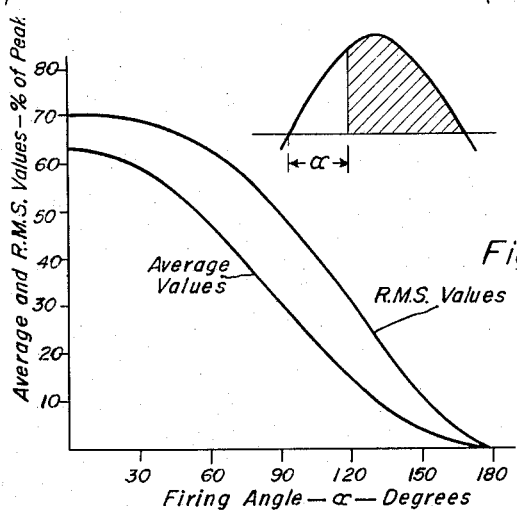
FIGURE 2 is a graph illustrating the effect of phase-control on the average and R.M.S. values of output voltage and current in single phase resistive load circuits.
Figure 3:
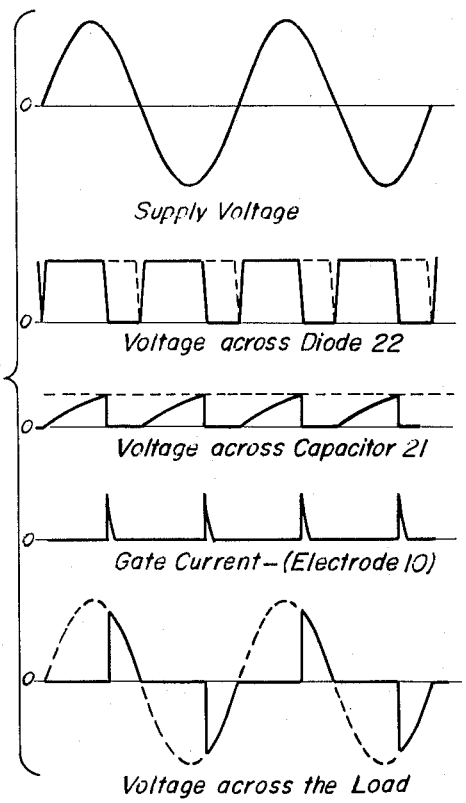
FIGURE 3 is a graph showing wave shapes at various locations in the circuit of FIGURE 1.

To better illustrate the effect of phase-control on the average and R.M.S. output voltage and current in single phase fullwave alternating current or direct current resistive load circuits, reference may be had to FIGURE 2. An increase in the firing angle results in a decrease in the voltage and current applied to the load. The bridge type rectifier circuit and trigger circuit 12 act to control the point in the alternating current cycle at which the controlled rectifier is rendered conducting and thus exert phase-control on each half of the alternating current cycle. A symmetrically controlled alternating current voltage is applied to the load 11 in series with the alternating current line. The wave shapes at various points in the circuit of FIGURE 1 are shown in FIGURE 3 and illustrate this symmetrically controlled alternating current voltage which is applied to the load 11 by action of the phase control of the alternating current source. Varying the firing angle of controlled rectifier 5 by changing the value of resistance 20 makes possible continuous variation in the voltage applied to the load from full voltage to as little as one percent of full voltage.

Because of the instantaneous voltage across controlled rectifier 5 and two of the diodes of the rectifier bridge, current reaches substantially a zero value each half cycle of the alternating current source. These voltages are in series across the line at any instant. The current is restrained each half cycle for a time interval which is adequate for regaining control of the anode of the controlled rectifier by the gate. For example, on a 60 cycle per second system, the current is restrained to a very low value for approximately 20 micro-seconds each half cycle. This is adequate for regaining control in commercially available controlled rectifier devices.

Figure 4:
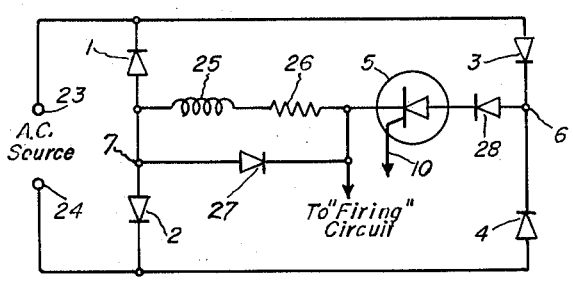
FIGURE 4 is a schematic digram of another embodiment of this invention particularly suitable when an inductive load is to be connected in the direct current section of the circuit.

For applications where the load is to be connected in the direct current section of the circuit and includes appreciable inductance, the embodiment shown in FIGURE 4 is often most suitable. In this embodiment, the load is shown schematically as inductance 25 and resistance 26. The load is connected in series with the controlled rectifier between the points 6 and 7. The fullwave alternating current is phase controlled by the controlled rectifier, trigger circuit and rectifier circuit as described hereinbefore. Diode 27 is connected across the total load to maintain current flow through the load but not through the controlled rectifier during the interval when the alternating current source voltage passes through zero. This assures that the inductive load does not maintain current flow through the controlled rectifier to prevent the trigger circuit 12 from regaining control. In certain applications, it may be desirable to maintain the controlled rectifier in its blocking condition for a longer period of time. This result may be achieved when desired by the addition of one or more conventional diodes, as shown at 28, in series with the controlled rectifier. For many applications, however, the series diode 28 is not necessary to the operation of the circuit.

Figure 5:
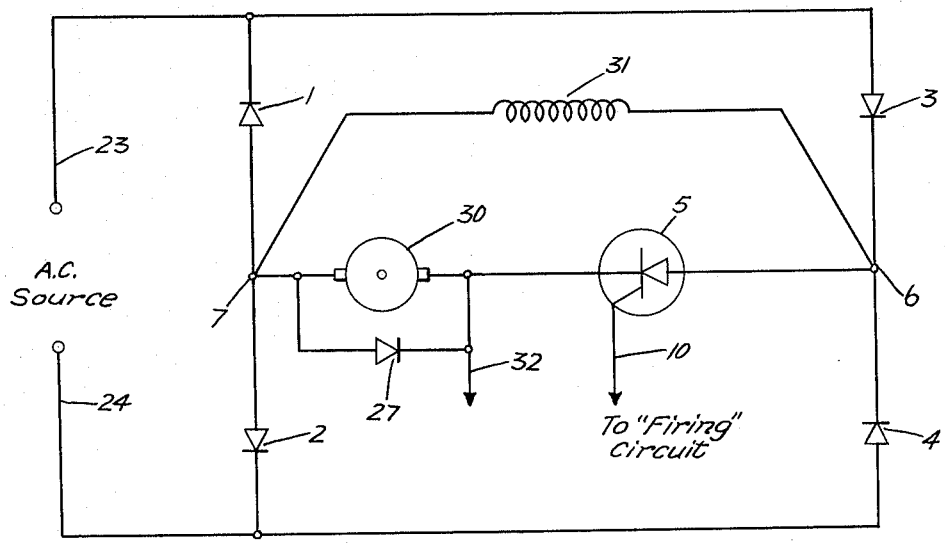
FIGURE 5 is a schematic diagram of the embodiment shown in FIGURE 4 adapted to or controlling the speed of a direct current shunt motor.

In FIGURE 5, I have illustrated the embodiment of my invention shown in FIGURE 4 adapted for operation of a D.C. shunt motor having a wound armature 30 and a field winding 31. It will be noted that the armature 30 replaces the load which in FIGURE 4 is represented schematically by the inductor 25 and resistor 26. The field winding 31 is connected across points 6 and 7 so that the output of the fullwave rectifier, which includes the diodes 1, 2, 3 and 4, is applied across the field winding 31. Lead 10 connected to the gate of the controlled rectifier 5 and lead 32 are provided for connection across the resistor 18 of the firing circuit 12 to couple the controlled rectifier 5 therewith.

The speed of the motor, which is shown schematically by armature 30 and the field winding 31, is controlled by the firing circuit. When the controlled rectifier 5 is fired at some predetermined point in each half cycle, pulses of power are supplied to the armature 30. Since the firing circuit 12 is also energized by the rectified output at points 6 and 7 of the fullwave rectifier, the firing circuit 12 will provide a pulse in each half cycle provided the back E.M.F. of the shunt motor is less than the instantaneous value of the line voltage. It was found that unless the diode 27 was connected across the armature 30 that the shunt motor could not be brought up to speed smoothly. The diode 27 maintains the current flow through the armature 30 but prevents inductive current flow through the controlled rectifier 5 as the rectified current at the output of the rectifier approaches zero during each cycle of the alternating current source. With the diode 27, it was possible to control the speed of the shunt motor from the stall condition to full speed.

One phase controlled alternating current circuit constructed in accord with the present invention utilized the following circuit parameters which are given by way of example only:

| | |
|---|---|
| Diodes 1 to 4 | General Electric semiconductor diodes #1N2156. |
| Controlled rectifier 5 | General Electric C35B silicon controlled rectifier. |
| Resistance 13 | 3900 ohms. |
| Double-base diode 14 | General Electric 2N489 "unijunction" transistor. |
| Resistance 18 | 47 ohms. |
| Resistance 19 | 2700 ohms. |
| Resistance 20 | 100,000 ohms (variable). |
| Capacitance 21 | 0.1 microfarad. |
| Breakdown diode 22 | Zener regulator 20 volt; 1 watt. |

The above circuit continuously controlled the current and voltage applied to a load in series with the alternating current line.

This invention provides, therefore, an improved phase controlled alternating current circuit having circuit simplicity and reduced cost. In addition, in many applications the current duty cycle of the controlled rectifier is improved and the requirement for providing overcurrent protection is substantially alleviated from prior art circuits utilizing controlled rectifiers. Since no peak inverse voltage can be applied to the controlled rectifier in the circuit of the present invention, very little safety factor need be provided in the voltage rating of the controlled rectifier. For example, the controlled rectifier may be turned on safely in the forward direction by voltage transients but not so in the reverse direction. Since the controlled rectifier is connected within the rectifier circuit in the present invention, no reverse transients are impressed on the controlled rectifier and very little safety factor need be provided in this respect.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent of the United States is:

1. A phase controlled alternating current circuit comprising: first and second alternating current source terminals; first and second alternating current load terminals; a fullwave rectifier circuit having first and second alternating current input terminals and first and second direct current output terminals; means connecting said first alternating current input terminal to said first alternating current source terminal; means connecting said alternating current load terminals in series between said second alternating current input terminal and said second alternating current source terminal; a controlled rectifier connected between said direct current output terminals of said rectifier circuit such that forward bias is applied to said controlled rectifier each half cycle of said alternating current source and means; and means for controlling the point in the alternating current cycle at which said controlled rectifier becomes conducting.

2. A phase controlled alternating current circuit comprising: a pair of alternating current source terminals;

a pair of alternating current load terminals; a bridge-type rectifier circuit having a pair of alternating current input terminals and a pair of direct current output terminals to provide a fullwave rectified output; means connecting said alternating current load terminals and said alternating current input terminals in series with said alternating current source terminals; a controlled rectifier having a main current path connected between said pair of direct current output terminals of said rectifier circuit such that forward bias is applied to said controlled rectifier each half cycle of said alternating current source, said controlled rectifier having a control electrode and being capable of operation in a blocking and a conducting state; and means synchronized with the alternating current at said alternating current source terminals and connected to said control electrode for controlling the point in the alternating current cycle at which said controlled rectifier switches from its blocking to its conducting state.

3. A phase controlled alternating current circuit comprising: a pair of alternating current source terminals; a pair of alternating current load terminals; a bridge-type rectifier circuit having a pair of alternating current input terminals and a pair of direct current output terminals to provide a fullwave rectified output; means connecting said alternating current load terminals and said alternating current input terminals in series between said alternating current source terminals; a controlled rectifier having a main current path connected between said pair of direct current output terminals of said rectifier circuit such that forward bias is applied to said controlled rectifier each half cycle of said alternating current source, said controlled rectifier having a control electrode and being capable of operation in a blocking and a conducting state; and means connected to said rectifier circuit and said control electrode for controlling the point in the alternating current cycle at which said controlled rectifier switches from its blocking to its conducting state.

4. A phase controlled alternating current circuit comprising: a pair of alternating current source terminals, a pair of alternating current load terminals, a bridge-type fullwave rectifier circuit having alternating current input terminals and direct current output terminals; means connecting said alternating current load terminals and said alternating current input terminals in series between said alternating current source terminals; a controlled rectifier connected within said rectifier circuit between said direct current output terminals such that forward bias is applied to said controlled rectifier each half cycle of the alternating current source; and trigger circuit means connected within said rectifier circuit having a fullwave rectified voltage applied thereto, the output of said trigger circuit coupled to said controlled rectifier and controlling the point in the alternating current cycle at which said controlled rectifier becomes conducting.

5. A phase controlled alternating current circuit comprising: a fullwave rectifier circuit adapted for connection to an alternating current source; a controlled rectifier connected within said rectifier circuit such that forward bias is applied to said controlled rectifier each half cycle of the alternating current source; and means also connected to said rectifier circuit for controlling the point during each half cycle of the alternating current source at which said controlled rectifier becomes conducting, said means consisting of a relaxation oscillator circuit having its output synchronized with said alternating current source and being of sufficient magnitude to render said controlled rectifier conducting in response thereto.

6. A phase controlled alternating current circuit comprising: a fullwave rectifier circuit adapted for connection to an alternating current source; a controlled rectifier connected within said rectifier circuit such that forward bias is applied to said controlled rectifier each half cycle of the alternating current source; and means for controlling the point in each half cycle of the alternating current source at which said controlled rectifier is rendered conducting, said means consisting of a relaxation oscillator circuit utilizing a double-base diode as the active circuit element therein and being connected with said rectifier circuit such that the fullwave rectified signal obtained therefrom supplies both power and a synchronizing signal to said oscillator, the output of said synchronized relaxation oscillator circuit being coupled to the gate electrode of said controlled rectifier.

7. A phase controlled alternating current circuit comprising: a rectifier bridge adapted for connection to an alternating current source; a controlled rectifier having an anode, cathode and gate, said controlled rectifier being connected within said rectifier bridge and poled so that a forward bias is applied to said controlled rectifier in each half cycle of the alternating current source; a double base diode having a base-one electrode, a base-two electrode and an emitter electrode; a variable resistor means, a capacitor connected in series circuit relation with said variable resistor means by a series connection, said emitter of said double base diode connected in circuit with said series connection; circuit means connecting said serially connected variable resistance means and capacitor in circuit within said rectifier bridge, said base-one and base-two electrodes connected in circuit across said serially connected variable resistance means and capacitor; and means coupling the gate of said controlled rectifier in circuit with the base-one electrode of said double base diode so that a firing signal is applied at the gate thereof when said capacitor is charged to the emitter peak point voltage of said double base diode, said variable resistor means controlling the phase angle at which said controlled rectifier is fired.

8. The phase controlled alternating current circuit as set forth in claim 7 wherein a breakdown diode is connected across said serially connected variable resistance means and capacitor to provide a clipped D.C. voltage thereacross.

9. A phase controlled alternating current circuit comprising: a full wave rectifier having four diodes connected in a bridge arrangement and adapted for connection to an alternating current source, a controlled rectifier having an anode, cathode and a gate, said anode of said controlled rectifier connected in circuit with the cathodes of a first pair of said four diodes of the full wave rectifier, said cathode of said controlled rectifier connected in circuit with the anodes of a second pair of said four diodes, one of the diodes of each of said first and second pairs of diodes providing a path for the flow of current through the bridge arrangement when the controlled rectifier conducts in one half cycle, the other of the diodes of said first and second pairs of diodes providing a path for the flow of current through the bridge arrangement when the controlled rectifier conducts in the other half cycle, a relaxation oscillator circuit connected in circuit within said bridge arrangement and energized when the controlled rectifier is turned off, said oscillator including a double base diode having a base-one electrode, a base-two electrode and an emitter electrode, a variable resistance means, a capacitor serially connected with said variable resistance means at a junction, said emitter electrode being connected in circuit with said junction, said base-one and base-two electrodes being connected in circuit across said serially connected variable resistance means and capacitor, said variable resistance means controlling the phase angle at which the capacitor is charged to the emitter peak point voltage of the double base diode to cause the double base diode to be fired, and means coupling said relaxation oscillator in circuit with the gate of said controlled rectifier to trigger said controlled rectifier into conduction when said double base diode is fired.

10. The phase controlled alternating current circuit set forth in claim 9 wherein a breakdown diode is connected in circuit across said relaxation oscillator to provide a clipped D.C. voltage thereto.

11. A phase controlled alternating current circuit comprising: a full wave rectifier circuit adapted for connection to an alternating current source; a controlled rectifier connected within said rectifier bridge and having an anode, cathode and a gate, said anode and cathode being connected so that said controlled rectifier is forward biased in each half cycle of the alternating current; a double base diode having a base-one electrode, a base-two electrode and an emitter electrode; an impedance element connected in circuit with said base-one electrode, said impedance element and said double base diode being connected in series circuit relation across said controlled rectifier; a variable resistance means, a capacitor, said variable resistance means and said capacitor joined by a series connection, said serially connected variable resistance means and capacitor connected in circuit across said serially connected double base diode and impedance element; a breakdown diode connected in circuit across said serially connected variable resistance means and said capacitor, said capacitor being joined in circuit with the emitter electrode through said series connection, said double base diode firing when the voltage across said capacitor reaches the emitter peak point voltage of the double base diode; and circuit means coupling said impedance element across the gate and cathode of said controlled rectifier, said double base diode when fired causing said capacitor to discharge through said impedance element to trigger said controlled rectifier.

12. A phase controlled alternating current circuit comprising: a rectifier bridge having input terminals adapted for connection to an alternating current source and having direct current output terminals; a controlled rectifier having an anode, cathode and gate, said anode and cathode of said controlled rectifier being connected between said output terminals of said rectifier bridge and poled so that a forward bias is applied to said controlled rectifier in each half cycle of the alternating current source; a semiconductor switching device coupled between said output terminals of said rectifier bridge and operable between a low impedance and a high impedance condition; a timing circuit coupled to said rectifier bridge and to said semiconductor device to switch said semiconductor device from the high impedance condition to the low impedance condition at a selected phase angle in each half cycle; and means coupling said semiconductor switching device with the gate of said controlled rectifier to trigger said controlled rectifier into conduction when said semiconductor device is switched from one condition to the other condition.

13. A phase controlled alternating current circuit comprising: a pair of alternating current source terminals, a pair of alternating current load terminals, a full wave rectifier having four diodes connected in a bridge arrangement, means connecting said bridge arrangement, said pair of alternating current source terminals, and said pair of alternating current load terminals in series, a controlled rectifier having an anode, a cathode and a gate, said anode of said controlled rectifier connected in circuit with the cathodes of a first pair of said four diodes of the full wave rectifier, said cathode of said controlled rectifier connected in circuit with the anodes of a second pair of said four diodes, one of the diodes of each of said first and second pair of diodes providing a path for the flow of current through the bridge arrangement when the controlled rectifier conducts in one half cycle, the other of the diodes of said first and second pairs of diodes providing a path for the flow of current through the bridge arrangement when the controlled rectifier conducts in the other half cycle, a semiconductor switching device operable between a high impedance condition and a low impedance condition, means associated with said semiconductor device for switching said device from the high impedance condition to the low impedance condition at a selected phase angle in each half cycle, and means coupling said semiconductor device with the gate of said controlled rectifier to trigger said controlled rectifier into conduction when said semiconductor device is switched from a high impedance to a low impedance condition.

References Cited by the Examiner

UNITED STATES PATENTS

| | | | |
|---|---|---|---|
| 2,202,732 | 5/1940 | Garmen | 323—34 |
| 2,290,657 | 7/1942 | Vedder | 323—34 |
| 2,909,705 | 10/1959 | Husson | 315—168 |
| 2,925,545 | 2/1960 | Fisher | 318—345 |
| 2,986,688 | 5/1961 | Dunigan | 318—345 |
| 3,061,747 | 10/1962 | Schlicher | 307—88.5 |
| 3,116,446 | 12/1963 | Healey | 323—22 |
| 3,161,759 | 12/1964 | Gambill et al. | 219—494 |
| 3,176,212 | 3/1965 | De Puy | 323—22 |

OTHER REFERENCES

General Electric "Controlled Rectifier Manual," March 1960, pp. 94–96 relied on.

"Notes on the Application of the Silicon Controlled Rectifier," Application Engineering, General Electric Co., ECG–371–1. December 1958; page 44.

LLOYD McCOLLUM, *Primary Examiner.*

ORIS L. RADER, *Examiner.*

S. GORDON, H. B. KATZ, D. L. RAE,
*Assistant Examiners.*